3,085,997
VINYL ETHER POLYMERIZATION CATALYSTS
Fred Eli Martin, South Charleston, W. Va., assignor to Union Carbide Corporation, a corporation of New York
No Drawing. Filed July 5, 1957, Ser. No. 669,968
19 Claims. (Cl. 260—91.1)

This invention relates to improvements in the catalytic polymerization of vinyl ethers.

Polymeric vinyl alkyl ethers of high molecular weight have heretofore been prepared only by polymerization of highly purified monomers at extremely low temperatures in the presence of catalysts such as acid-reacting catalysts and sulfur dioxide.

According to this invention, vinyl alkyl ethers are polymerized to viscous liquid or solid form-stable, rubber-like polymers by using as a catalyst an organo-metallo-halide of the general formula RMX in which R is a hydrocarbon radical such as an alkyl, aryl or aralkyl radical, M is a metal atom such as zinc or magnesium and X is a halogen atom, at temperatures of from about 0° C. to about 100° C.

The organo-metallo-halides, or Grignard reagents, are readily prepared by the reaction under anhydrous conditions of a hydrocarbon halide with the metal by procedures which are well known in the art; these compounds are unstable and decompose when they come into contact with water. The catalyst can be used as produced in the Grignard reaction, or it may be isolated and/or purified before use, or it may be used as the etherate complex.

Illustrative of the organo-metallo-halides which are suitable for use as catalysts in this invention are methylmagnesium iodide, n-butylmagnesium chloride, ethylmagnesium chloride, t-butylmagnesium chloride, n-butylmagnesium bromide, phenylmagnesium bromide, phenylmagnesium chloride, and the like.

The amount of organo-metallo-halide required to catalyze the polymerization of the vinyl alkyl ethers or vinyl aryl ethers is not critical, the useful range being from about 0.00005 to about 15% by weight of monomer, or higher. The preferred concentration when the catalyst is the etherate complex is from about 0.01 to about 0.5% by weight when a catalyst promoter is present, and from about 1 to about 5% by weight in the absence of a catalyst promoter. When the Grignard reagent is produced and then separated from the reaction mixture by the addition of an anhydrous inert solvent such as benzene, to aid in the removal of the ether, and then further heated to remove the etherate moiety from the residual mixture, the resulting slurry is an extremely active catalyst which is preferably employed at concentrations of from about 0.1 to about 1% by weight in the absence of a promoter. When the ether is removed from the Grignard reaction mixture by simple distillation techniques, the preferred catalyst concentration is from about 1 to about 5% by weight in the absence of a promoter.

Vinyl ethers suitable in the practice of this invention include all polymerizable compounds containing one or more vinoxy groups, $CH_2=CHO-$. Among the vinyl ethers which can be used in this invention are the vinyl alkyl ethers and the vinyl aryl ethers, including the substituted vinyl alkyl and vinyl aryl ethers. Suitable illustrative ethers are vinyl methyl ether, vinyl ethyl ether, vinyl propyl ether, vinyl isopropyl ether, vinyl butyl ether, vinyl isobutyl ether, vinyl 2-ethylbutyl ether, vinyl 2-ethylhexyl ether, vinyl 2-butyloctyl ether, vinyl octyl ether, vinyl lauryl ether, vinyl allyl ether, vinyl 1-isobutenyl ether, vinyl phenyl ether, vinyl 2-chloroethyl ether, vinyl 2-methoxyethyl ether, methoxybutadiene, vinyl 2-butoxyethyl ether, 2-butoxy-2'-vinyloxy diethyl ether, 3,4-dihydro-1,2-pyran, vinyl 2-ethylmercaptoethyl ether, and the like.

The vinyl ethers need not be of high purity for use in the process of the present invention; good results have been obtained with vinyl ether monomers of about 98% purity. In addition, the catalysts of this invention are equally effective in promoting the polymerization when one of the usual anti-oxidant stabilizers for the polymer is added to the vinyl ethers prior to polymerization. Also, two or more of the vinyl ethers may be copolymerized to obtain polymers having properties different from the homopolymers obtained by polymerizing one of the components of the mixture by itself.

The polymerization can be carried out under anhydrous conditions in the presence or in the absence of solvents. As suitable solvents may be mentioned chloroform, isopentane, benzene, toluene, methylene chloride, and the like, which are inert under the polymerization conditions and do not adversely affect the catalyst.

Small amounts of agents, such as oxygen-producing agents, for example, oxygen, peroxides such as benzoyl peroxide, acetyl peroxide, t-butyl peroxide, and the like; or agents having an active halogen atom such as triphenyl methyl chloride, acetyl chloride, benzoyl chloride, chloroacetyl chloride, acetyl fluoride, and the like, are suitable as polymerization accelerators or promoters.

The polymerization of the vinyl ether proceeds readily upon mixing the ether with the catalyst at temperatures of from about $-15°$ C. up to about room temperature or higher. The catalyst mixture is preferably added as a solution or suspension of the organo-metallo-halide catalyst in an inert organic diluent; and where a catalyst accelerator is used, the addition of the accelerator is made slowly in several aliquots. The polymerization may be carried out in bulk or in the presence of an inert organic solvent as heretofore indicated. When a solvent is used, it is removed by distillation, or other conventional means upon completion of the polymerization. The isolated polymers may be thick viscous liquids or form-stable, rubber-like solids; by the term form-stable is meant that the polymers can be used to produce articles which will retain their shape when removed from the mold. They form valuable adhesives, coatings and films.

The reduced viscosity measurements, $I_R$, may be defined by the equation:

$$I_R = \frac{\frac{V_2}{V_1}-1}{C}$$

wherein $V_2$ is the viscosity of the solution, $V_1$ is the viscosity of the solvent and $C$ is the concentration of the solution in grams per 100 ml. of solvent. Measurements were made at 20° C. using a solution of 0.1000 gram of polymer in 100 ml. of benzene.

The following examples further serve to illustrate this invention.

*Example 1*

There was charged 400 grams of vinyl ethyl ether to a clean, dry, nitrogen-purged flask. Then 4 ml. of a slurry of 1.35 N of t-butylmagnesium chloride monoetherate in toluene was added and the mixture was stirred. The temperature increased from 25° C. to 37° C. during 11 minutes. The polymerization was then short-stopped, i.e., brought to a stop, by the addition of 400 ml. of water to destroy the catalyst, and 4 ml. of concentrated ammonium hydroxide and 0.8 gram of butylated hydroxyanisole were added. This mixture was stirred at the reflux temperature of water to remove unreacted monomer. The aqueous layer was decanted and the resin dried at 100° C. under vacuum. The dried resin was a colorless, rubber-like, form-stable solid, which weighed 40 grams and had a reduced viscosity of 12.9.

Example 2

There was charged 100 grams of vinyl n-butyl ether to a clean, dry, nitrogen-purged flask. Then a total of 7.5 ml. of a slurry of 2.47 N n-butylmagnesium chloride in benzene was added in several small portions to the stirred contents so that the temperature would rise to a maximum and begin to decline before the next addition of catalyst. The maximum reaction temperature, 64° C., was achieved 34 minutes after the initial portion of catalyst was introduced. The reaction mixture was then further stirred for a total reaction time of 122 minutes. Unreacted monomer, weighting 51 grams, was removed by vacuum distillation at about 2 to 5 mm. mercury pressure. The yield was 48 grams.

A 36 gram aliquot was dissolved in 250 ml. of chloroform, stabilized with 0.2 gram of butylated hydroxyanisole, and washed with 200 ml. of an approximately 2% aqueous solution of hydrochloric acid, and then with 200 ml. of water. The polymer solution was then washed with 200 ml. of an approximately 2% aqueous solution of ammonium hydroxide, and the chloroform was removed by distillation. The remaining water was decanted from the slurry, and the resin was dried by heating under vacuum. The resin was a colorless, rubber-like, form-stable solid having a reduced viscosity of 9.54.

The following examples, 3 to 6, were carried out in substantially the same manner as described in Example 2.

| Example No. | 3 | 4 | 5 | 6 |
|---|---|---|---|---|
| Vinyl ethyl ether, g | 100 | | | |
| Vinyl n-butyl ether, g | | 100 | 100 | 100 |
| Catalyst | A | B | C | D |
| Milliliters | 5 | 4 | 2.5 | 15 |
| Reaction conditions: | | | | |
| Initial temp., ° C | 0 | 33 | 30 | 27 |
| Maximum temp., ° C | 41 | 43 | 47 | 76 |
| Time to maximum temp., min | 25 | 71 | 17 | 19 |
| Total reaction time, min | 107 | 116 | 67 | 91 |
| Product: | | | | |
| Weight, g | 65 | 78 | 51 | [1] 74 |
| Reduced viscosity | 6.86 | 0.27 | 0.667 | 0.89 |

[1] The acid wash was omitted.

NOTE.—A=2.47 N n-butylmagnesium chloride in benzene. B=4 N methylmagnesium iodide in ethyl ether. C=1.8 N ethylmagnesium bromide etherate in benzene. D=Slurry in benzene prepared from the precipitate formed in the preparation of t-butylmagnesium chloride in diethyl ether, solids in slurry were 0.0054 g./ml.

The polymer obtained in Example 3 was a rubber-like, form-stable solid, and the polymers of Examples 4, 5, and 6 were viscous liquids.

Example 7

There were charged 50 grams of vinyl 2-butyloctyl ether and 200 grams of chloroform to a clean, dry, nitrogen-purged flask. Then a total of 22.5 ml. of a 1.82 N slurry of n-butylmagnesium chloride in di-n-butyl ether was added in small portions to the stirred contents so that the temperature would rise to a maximum and begin to decline before the next addition of catalyst. When further addition of catalyst caused only a negligible temperature change, catalyst addition was stopped. The maximum temperature achieved was 44° C. during the catalyst addition period of 27 minutes. The reaction mixture was then further stirred at reflux for a total reaction time of 75 minutes. Then there was added 0.2 gram of butylated hydroxyanisole to the mixture; the solution was washed with 200 ml. of an approximately 2% aqueous solution of hydrochloric acid, and then with 200 ml. of water. There was added 200 ml. of an approximately 2% aqueous solution of ammonium hydroxide to the polymer solution, and the chloroform was removed by distillation. The remaining water was decanted and the resin was dried by heating under vacuum. The dried resin was a viscous liquid, which weighed 46 grams and had a reduced viscosity of 0.087.

The following examples, 8 to 16, were carried out in substantially the same manner as described in Example 7.

| Example No. | 8 | 9 | 10 | 11 | 12 | 13 | 14 | 15 | 16 |
|---|---|---|---|---|---|---|---|---|---|
| Vinyl ethyl ether, g | | | 50 | | | | | | |
| Vinyl n-butyl ether, g | 40 | 50 | | | 50 | 50 | 50 | 50 | 50 |
| Vinyl 2-ethylhexylether, g | | | | 50 | | | | | |
| Isopentane, g | 160 | | | | | | | | |
| Chloroform, g | | 200 | 200 | 200 | | 200 | | | |
| Benzene, g | | | | | | | | 200 | |
| Methylene chloride, g | | | | | 200 | | | | |
| Toluene, g | | | | | | | 200 | | 200 |
| Catalyst | E | A | A | A | F | G | H | I | J |
| Milliliters | 2.7 | 15 | 12.5 | 12.5 | 10 | 25 | 4 | 15 | 4 |
| Reaction conditions: | | | | | | | | | |
| Initial temp., ° C | 30 | 32 | 28 | 1 | 31 | 4 | 25 | 27 | 26 |
| Maximum temp., ° C | | 63 | 49 | 50 | 40 | 54 | 31 | 49 | 39 |
| Time to maximum temp., min | | 20 | 11 | 61 | 151 | 53 | 35 | 20 | 13 |
| Total reaction time, min | 192 | 40 | 35 | 93 | 238 | 123 | 75 | 57 | 60 |
| Product | [1] | [1] | [1] | [2] | [3] | [2] | [1] | [3] | [3] |
| Weight, g | 3 | 48 | 49.4 | 48 | 50 | 35 | [4] 18 | 48.5 | 16 |
| Reduced viscosity | 3.27 | 3.61 | 5.88 | 0.585 | 1.24 | 0.223 | 8.96 | 1.6 | 1.42 |

[1] Rubber-like form-stable solids. [2] Tacky, viscous liquid. [3] Tacky, semi-solid. [4] The acid wash was omitted NOTE.—A=2.47 N n-butylmagnesium chloride monoetherate in benzene. E=2.54 N n-butylmagnesium chloride in ethyl ether. F=3 N n-butylmagnesium chloride in ethyl ether. G=1.8 N ethylmagnesium bromide etherate in benzene. H=1.5 N t-butylmagnesium chloride in ethyl ether. I=1.22 N phenylmagnesium bromide in butyl ether. J=2.47 N n-butylmagnesium bromide etherate in benzene.

Example 17

The Grignard reagent n-butylmagnesium chloride was prepared in diethyl ether by the standard procedure using 65 grams of magnesium and 250 grams of n-butyl chloride in 603 grams of diethyl ether. Then 500 ml. of anhydrous benzene was added to 225 grams of the above Grignard reagent, and the ether was removed by fractional distillation, leaving a slurry of n-butylmagnesium chloride in benzene. The benzene was decanted, and the solid was re-suspended in 500 ml. of fresh anhydrous benzene. This slurry contained 0.1 gram of solids per milliliter of suspension.

There was charged 100 ml. of vinyl n-butyl ether to a clean, dry, nitrogen-purged flask, and while stirring there was added 0.1 ml. of the above prepared catalyst suspension. The initial temperature of 28° C. increased to 86° C. within 3 minutes and then decreased to 40° C. during the next 46 minutes. The unreacted monomer was removed by heating under vacuum. The tacky, semi-solid resin weighed 69 grams and had a reduced viscosity of 1.19.

Example 18

One hundred grams of vinyl ethyl ether was polymerized in substantially the same manner as described in Example 17 using 1.0 ml. of the catalyst suspension therein described. The catalyst was added in two aliquots. The initial temperature of 26° C. increased to 39° C. within 11 minutes. The total reaction time was 58 minutes. Unreacted monomer was then removed under vacuum. The resin obtained weighed 65 grams and had a reduced viscosity of 1.19.

Example 19

There were charged 50 grams of vinyl ethyl ether and 200 grams of toluene to a clean, dry, nitrogen-purged reaction flask. There was added, with stirring, 2 ml. of a 33% by weight solution of t-butylmagnesium chloride monoetherate in toluene and 0.1 ml. of a 20% solution by volume of acetyl chloride in toluene. The initial temperature of 25° C. rose to a maximum temperature of 35° C. in 9 minutes. The mixture was then stirred for a total reaction time of 90 minutes. Then 0.2 gram of butylated hydroxyanisole, 1 ml. of concentrated ammonium hydroxide and 250 ml. of water were added, and the unreacted monomer and solvent were removed by distilling at the reflux temperature of water. The resin was dried by stripping under vacuum. The colorless, rubber-like, form-stable solid dried resin weighed 21 grams and had a reduced viscosity of 13.22.

For comparison purposes Example 19 was repeated using twice the catalyst promoter and omitting the catalyst promoter; results are tabulated below:

| Experiment | (A) | (B, Ex. 19) | (C) |
|---|---|---|---|
| Catalyst promoter, ml | 0.0 | 0.1 | 0.2 |
| Reaction conditions: | | | |
|   Initial temp., ° C | 24 | 25 | 24 |
|   Maximum temp., ° C | 27 | 35 | 48 |
|   Time to max. temp., min | 10 | 9 | 16 |
| Product | (¹) | (¹) | (¹) |
|   Weight, g | 5.5 | 21 | 36 |
|   Yield, percent | 11.0 | 42 | 72 |
|   Reduced viscosity | 12.48 | 13.22 | 9.41 |

¹ Rubber-like, form-stable solids.

The following Examples 20 to 25 were carried out in substantially the same manner as described in Example 19.

| Example No | 20 | 21 | 22 | 23 | 24 | 25 |
|---|---|---|---|---|---|---|
| Vinyl ethyl ether, g | 100 | 100 | 200 | 50 | | |
| 1-methoxy-1,3-butadiene, g | | | | | 100 | 100 |
| Solvent | None | None | None | Toluene | None | None |
|   Grams | | | | 200 | | |
| Catalyst | A | B | C | A | C | C |
|   Milliliters | 2.0 | 10.0 | 6.0 | 4.0 | 10 | 10 |
| Catalyst promoter | (ᵃ) | (ᵇ) | (ᶜ) | (ᵈ) | (ᵉ) | (ᶠ) |
|   Milliliters | 0.1 | | 6.0 | 2.0 | 1.0 | 10 |
| Reaction conditions: | | | | | | |
|   Initial temp., °C | 23 | 30 | 26 | 28 | 25 | 23 |
|   Maximum temp., °C | 36 | 37 | 27 | 29 | 80 | 80 |
|   Time to max. temp., min | 89 | 73 | (ᵍ) | 29 | 16 | 2 |
|   Total reaction time, min | 119 | 192 | 132 | (ʰ) | 16 | 2 |
| Product | (¹) | (¹) | (¹) | (¹) | (²) | (²) |
|   Weight, g | 44 | 35 | 67 | 12 | 60 | 67 |
|   Reduced viscosity | 4.5 | 3.9 | 12.0 | 6.0 | 0.8 | 0.77 |

¹ Rubber-like, form-stable solids. ² Tacky, semi-solids.
ᵃ Acetyl chloride.
ᵇ Oxygen (The reaction mixture was exposed to atmospheric oxygen for three five-second intervals.)
ᶜ Benzoyl peroxide (A solution consisting of 1 gram of benzoly peroxide in 10 ml. of solution.)
ᵈ Triphenyl methyl chloride (A solution consisting of 1 gram of triphenyl methyl chloride in 20 ml. of solution.)
ᵉ Acetyl chloride (20 percent by volume) in heptane.
ᶠ Benzoyl chloride (A solution consisting of 1 g. of benzoyl chloride in 10 ml. of solution.)
ᵍ An explosive reaction occurred on the last addition of promoter solution.
ʰ Reaction mixture was allowed to stand overnight.
NOTE.—A=1.37 N t-butylmagnesium chloride in diethyl ether. B=2.14 N n-butylmagnesium chloride monoetherate in benzene. C=1.52 N n-butylmagnesium chloride monoetherate in heptane.

What is claimed is:

1. A process for the polymerization of polymerizable vinyl ethers, which comprises contacting said vinyl ethers as the sole polymerizable monomers under anhydrous conditions at a temperature of at least about −15° C. with a catalytic amount, sufficient to catalyze the polymerization, of a compound selected from the group represented by the general formula RMX, wherein R is a hydrocarbon radical selected from the group consisting of alkyl and aryl radicals, M is a member selected from the group consisting of zinc and magnesium, and X is a member selected from the group consisting of halogen atoms, as a catalyst; and said vinyl ethers being free from groups interfering with said polymerization.

2. A process for the polymerization of polymerizable vinyl ethers, which comprises contacting said ethers as the sole polymerizable monomers under anhydrous conditions at a temperature of from about 0° C. to about 100° C. with a catalytic amount, sufficient to catalyze the polymerization, of a compound selected from the group represented by the general formula RMgX, wherein R is a hydrocarbon radical selected from the group consisting of alkyl and aryl radicals, and X is a member selected from the group consisting of halogen atoms; and said vinyl ethers being free from groups interfering with said polymerization.

3. A process for the polymerization of polymerizable vinyl ethers, which comprises contacting said ethers as the sole polymerizable monomers at a temperature of from about 0° C. to about 100° C. with a catalytic amount, sufficient to catalyze the polymerization, of a compound selected from the group represented by the general formula RMgX, wherein R is a hydrocarbon radical selected from the group consisting of alkyl and aryl radicals, and X is a member selected from the group consisting of halogen atoms, in the presence of normally liquid, anhydrous inert organic medium and a polymerization accelerator selected from the group consisting of oxygen, benzoyl peroxide, acetyl peroxide, t-butyl peroxide, triphenyl methyl chloride, acetyl chloride, benzoyl chloride, chloroacetyl chloride and acetyl fluoride; and said vinyl ethers being free from groups interfering with said polymerization.

4. A process for the polymerization of vinyl alkyl ethers which comprises contacting said ethers as the sole polymerizable monomers under anhydrous conditions at a temperature of from about 0° C. to about 100° C. with a catalytic amount of a compound selected from the group represented by the general formula RMgX, wherein R is a hydrocarbon radical selected from the group consisting of alkyl and aryl radicals, and X is a member selected from the group consisting of halogen atoms; and said vinyl ethers being free from groups interfering with said polymerization.

5. A process for the polymerization of vinyl aryl ethers, which comprises contacting said ethers as the sole polymerizable monomers under anhydrous conditions at a temperature of from about 0° C. to about 100° C. with a catalytic amount of a compound selected from the group represented by the general formula RMgX, wherein R is a hydrocarbon radical selected from the group consisting of alkyl, aryl and aralkyl radicals, and X is a member selected from the group consisting of halogen atoms; and said vinyl ethers being free from groups interfering with said polymerization.

6. A process for the polymerization of vinyl aryl ethers, which comprises contacting said ethers as the sole polymerizable monomers at a temperature of from about 0° C. to about 100° C. in the presence of a normally liquid, anhydrous inert medium with a catalytic amount of a compound selected from the group represented by the general formula RMgX, wherein R is a hydrocarbon radical selected from the group consisting of alkyl, aryl and aralkyl radicals, and X is a member selected from the group consisting of halogen atoms; and said vinyl ethers being free from groups interfering with said polymerization.

7. A process for the polymerization of a vinyl alkyl ether, which comprises contacting said ether as the sole polymerizable monomer under anhydrous conditions at a temperature of from about 0° C. to about 100° C. with a catalytic amount of a compound selected from the group represented by the general formula RMgX, wherein R is a hydrocarbon radical selected from the group consisting of alkyl and aryl radicals, and X is a member selected from the group consisting of halogen atoms, in the presence of a polymerization accelerator selected from the group consisting of oxygen, benzoyl peroxide, acetyl peroxide, t-butyl peroxide, triphenyl methyl chloride, acetyl chloride, benzoyl chloride, chloroacetyl chloride and acetyl fluoride; and said vinyl ethers being free from groups interfering with said polymerization.

8. A process for the polymerization of vinyl alkyl ethers, which comprises contacting said ethers as the sole polymerizable monomers at a temperature of from about 0° C. to about 100° C. with a catalytic amount of a compound selected from the group represented by the general formula RMgX, wherein R is a hydrocarbon radical selected from the group consisting of alkyl and aryl radicals, and X is a member selected from the group consisting of halogen atoms, in the presence of a normally liquid, anhydrous inert organic medium and a polymerization accelerator selected from the group consisting of oxygen, benzoyl peroxide, acetyl peroxide, t-butyl peroxide, triphenyl methyl chloride, acetyl chloride, benzoyl chloride, chloroacetyl chloride and acetyl fluoride; and said vinyl ethers being free from groups interfering with said polymerization.

9. A process for the polymerization of vinyl ethyl ether, which comprises contacting said ether as the sole polymerizable monomer under anhydrous conditions at a temperature of from about 0° C. to about 100° C. with a catalytic amount of n-butylmagnesium chloride.

10. A process for the polymerization of vinyl n-butyl ether, which comprises contacting said ether as the sole polymerizable monomer under anhydrous conditions at a temperature of from about 0° C. to about 100° C. with a catalytic amount of methylmagnesium iodide.

11. A process for the polymerization of vinyl 2-ethylhexyl ether, which comprises contacting said ether as the sole polymerizable monomer under anhydrous conditions at a temperature of from about 0° C. to about 100° C. with a catalytic amount of phenylmagnesium chloride.

12. A process for the polymerization of vinyl ethyl ether, which comprises contacting said ether as the sole polymerizable monomer in the presence of anhydrous benzene at a temperature of from about 0° C. to about 100° C. with a catalytic amount of n-butylmagnesium chloride.

13. A process for the polymerization of vinyl 2-butyloctyl ether, which comprises contacting said ether as the sole polymerizable monomer in the presence of anhydrous chloroform at a temperature of from about 0° C. to about 100° C. with a catalytic amount of n-butylmagnesium chloride.

14. A process for the polymerization of vinyl ethyl ether, which comprises contacting said ether as the sole polymerizable monomer under anhydrous conditions at a temperature of from about 0° C. to about 100° C. with a catalytic amount of phenylmagnesium bromide in the presence of benzoyl peroxide as catalyst accelerating agent.

15. A process for the polymerization of vinyl 2-chloroethyl ether, which comprises contacting said ether as the sole polymerizable monomer under anhydrous conditions at a temperature of from about 0° C. to about 100° C. with a catalytic amount of ethylmagnesium chloride in the presence of acetyl chloride as catalyst accelerating agent.

16. A process for the polymerization of vinyl ethyl ether, which comprises contacting said ether as the sole polymerizable monomer at a temperature of from about 0° C. to about 100° C. with a catalytic amount of t-butylmagnesium chloride in the presence of anhydrous toluene and acetyl chloride as catalyst accelerating agent.

17. A process for the polymerization of polymerizable vinyl ethers, which comprises contacting said ethers as the sole polymerizable monomers under anhydrous conditions at a temperature of from about 0° C. to about 100° C. with a catalytic amount of t-butylmagnesium chloride monoetherate in the presence of anhydrous toluene; and said vinyl ethers being free from groups interfering with said polymerization.

18. A process for the polymerization of polymerizable vinyl ethers, which comprises contacting a mixture of at least two vinyl ethers as the sole polymerizable monomers under anhydrous conditions at a temperature of at least about −15° C. with a catalytic amount, sufficient to catalyze the polymerization of a compound selected from the group represented by the general formula RMX, wherein R is a hydrocarbon radical selected from the group consisting of alkyl and aryl radicals, M is a member selected from the group consisting of zinc and magnesium, and X is a member selected from the group consisting of halogen atoms; and said vinyl ethers being free from groups interfering with said polymerization.

19. A process for the polymerization of a vinyl alkyl ether which comprises contacting said ether as the sole polymerizable monomer under anhydrous conditions at a temperature of from about 25° to about 100° C. with a catalytic amount of a compound selected from the group represented by the general formula RMX, wherein R is a hydrocarbon radical selected from the group consisting of alkyl and aryl radicals, and X is a halogen selected from the group consisting of bromine, iodine and chlorine, and M is a metal selected from the group consisting of magnesium and zinc, and said vinyl alkyl ether being free from groups interfering with said polymerization.

References Cited in the file of this patent
UNITED STATES PATENTS

| | | |
|---|---|---|
| 2,475,520 | Roedel | July 5, 1949 |
| 2,832,759 | Nowlin et al. | Apr. 29, 1958 |